UNITED STATES PATENT OFFICE.

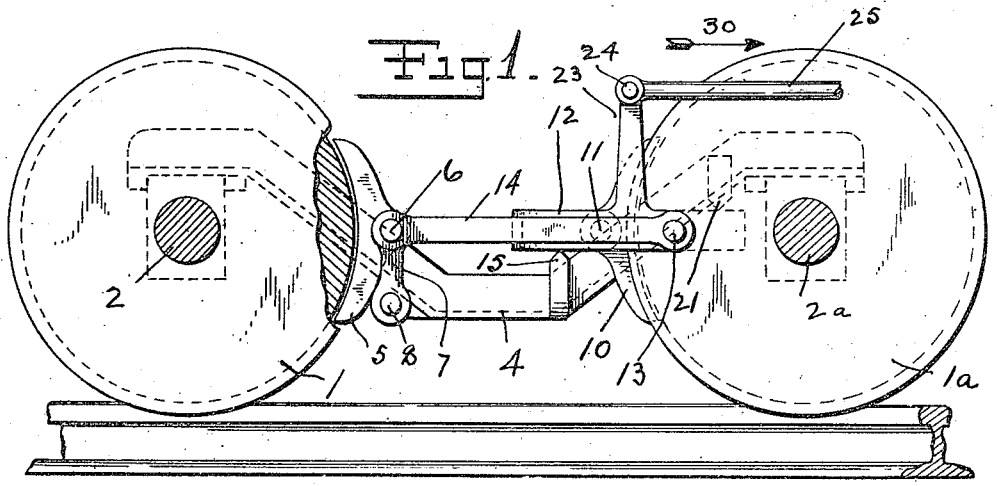
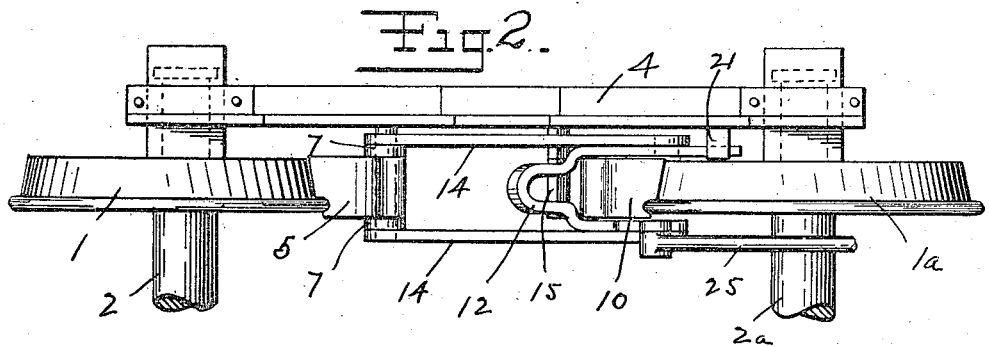
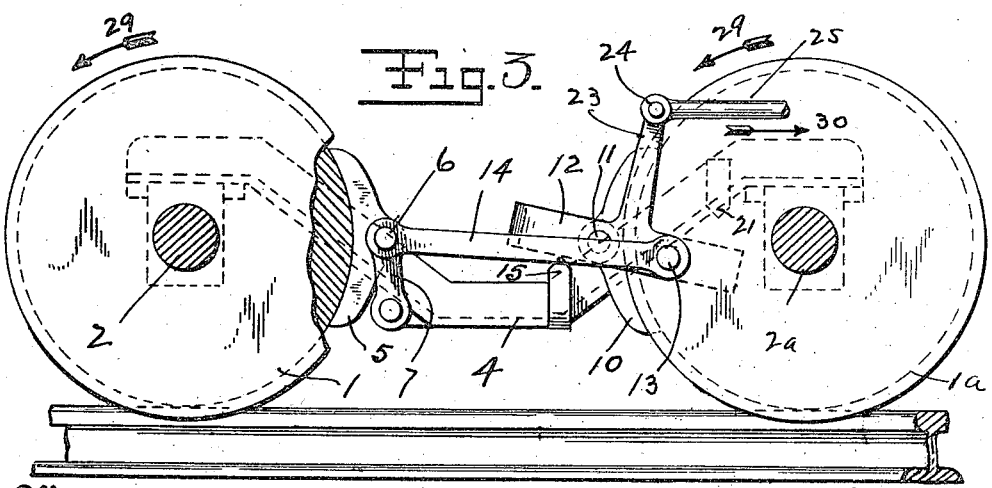

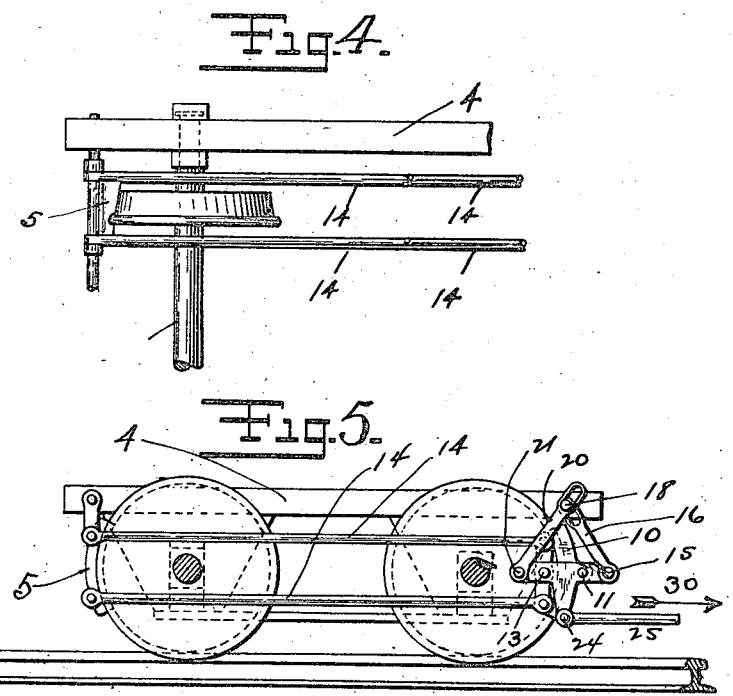

PORTER S. MORGAN, OF NORWALK, CONNECTICUT, ASSIGNOR, BY DIRECT AND MESNE ASSIGNMENTS, TO MOMENTUM BRAKE CORPORATION, A CORPORATION OF NEW YORK.

BRAKE MECHANISM.

1,269,199. Specification of Letters Patent. Patented June 11, 1918.

Application filed May 12, 1915. Serial No. 27,523.

*To all whom it may concern:*

Be it known that I, PORTER S. MORGAN, a citizen of the United States, and a resident of Norwalk, in county of Fairfield and State of Connecticut, have invented certain new and useful Brake Mechanism, of which the following is a specification.

My invention relates to that general character or type of brakes known as momentum brakes, which are distinguished from the ordinary type, in that the pressure or force necessary for applying the brake shoes to the brake wheel is furnished by the momentum of the moving body to be retarded. My particular construction and arrangement involves the use of a brake shoe of the ordinary pressure type as one of the elements of my mechanism and of using the same to act as an abutment for the reactive pressure of the momentum element.

In the accompanying drawings forming part of this specification Figure 1 illustrates my invention as applied to two car wheels on the same side of a truck and illustrates the same in side elevation; Fig. 2 is a partial plan view of Fig. 1; Fig. 3 is a side elevation as in Fig. 1 showing the brake mechanism in operation; Figs. 4 and 5 illustrate respectively a partial plan view and side elevation of my invention as applied to the opposite sides of the wheels of a car truck on the same side of the truck.

Similar numerals of reference refer to like parts throughout the several views.

Referring particularly to Figs. 1 and 2 of the drawings, the brake wheels are denoted by the numerals 1 and 1ª mounted on the axles 2 and 2ª and are secured thereto in the regular way. The axles are journaled in the truck side frame 4. Secured to or cast integrally with this frame are projections 15 and 21 which serve as anchorages or fulcrums and are adapted to be engaged by the ends of a T shaped lever 12, hereafter referred to as the momentum lever.

Pivoted to the momentum lever at 11 is the brake shoe 10 adapted to frictionally engage the wheel 1ª but normally free from contact with the said wheel. A second brake shoe 5 is adapted to engage the wheel 1 and is also normally free from contact with the same. The brake shoe 5 is supported from the frame 4 by the links 7, 7 the pin 6 and the stud 8, secured to the frame. The brake shoe 5 is also connected to the momentum lever 12 through the side links 14, 14, the pin 6 and the pivots 13, 13. The pivots 13, 13 and the pivot 11 are spaced near the center of the momentum lever and about equally distant on either side of the center.

The momentum lever 12 has an arm 23 extending approximately at right angles from its central part and the arm is connected to the brake operating lever at the end of the car (the lever is not shown) by the rod 25 pivoted to the arm 23 at 24.

The operation of my invention is as follows: If from the free position of the brakes shown in Figs. 1 and 2 and assuming that the car wheels were rotating counterclockwise, the operator was to move the control lever and with it the rod 25 in the direction of the arrow 30, the momentum lever would be tilted in a clockwise direction. By referring to Fig. 3 it will be noted that this angular rotation of the momentum lever would bring the brake shoe 10 into contact with the periphery of the wheel 1ª. The rotation of this wheel in the direction of the arrow 29 would bodily move the shoe and the momentum lever in the same direction and bring one end of the momentum lever 12 into contact with the fulcrum 15 and simultaneously also bringing the brake shoe 5 into contact with the wheel 1. The continued turning of the wheel 1ª in the same direction as the arrow 29, tends to increase the angularity of the momentum lever 12 due to the fulcrum 15 being beyond the pivoting point 11 and also to increase the pressure of the brake shoe 10 against the wheel 1ª. If the car wheels 1 and 1ª were rotating in the direction opposite to that shown by arrows 29, 29 the brake shoe 10, the momentum lever 12 and the link 14 would have been carried in the same direction that the wheel 1ª was rotating and against the anchorage fulcrum 21. It will be thus noted that for either direction of rotation of the car wheel 1ª, that anchorage fulcrum is selected which tends to increase the angularity of the momentum lever 12, and always in the same direction, so that the operator always moves the control hand lever the same way for engaging the brakes and the opposite way for disengaging them, irrespective of the direction of rotation of the wheels or of the movement of the car. The operator does not have to exert any force to produce a related braking action and he may graduate and control such braking to a nicety with almost no effort.

Figs. 4 and 5 show the pressure brake shoe 5 and the momentum brake shoe 10 arranged to act on the opposite faces of independent car wheels, on the same side of the car truck.

While I have illustrated and described several different applications of my brake mechanism I do not wish to be confined to the exact form and details of construction disclosed in this specification as other modifications may be used without in any way affecting the principle which I employ.

I claim:

1. The combination with two rotary elements, of a tiltable lever, a frictional member co-acting with each of said rotary elements, said two frictional members being attached to said lever at two distinct points, whereby upon tilting of said lever the points of attachment of said frictional members are caused to move in the same angular direction to different distances so as to initially apply said frictional members to said rotary elements, and means coöperating with said lever for causing said points of attachment to move farther in the direction of rotation of said rotary elements after engagement therewith.

2. The combination with two rotary elements, of a tiltable lever, a frictional member co-acting with each of said rotary elements, said two frictional members being attached to said lever at two distinct points, whereby upon tilting of said lever the points of attachment of said frictional members are caused to move to different distances so as to initially apply said frictional members to said rotary elements, and means coöperating with said lever for causing said points of attachment to move farther in the direction of rotation of said rotary elements after engagement therewith.

3. The combination with two rotary elements, of frictional members adapted to be applied thereto for retarding the movement thereof, a tiltable lever to which said frictional members are attached at two distinct points, stationary fulcrums coöperating with said lever and adapted to serve as an anchorage for either end thereof so that a tilting of said lever causes the points of attachment of said frictional members to move to different distances, and means connected to said lever for tilting the same, at will, whereby said frictional members are caused to engage said rotary elements, the movement of one of said rotary elements then causing the points of attachment to further move in the direction of rotation thereof.

4. The combination with two rotary elements, of a frictional member coöperating with each of the same, a connection between said two members to cause the same to move simultaneously into contact with said elements, and means co-acting with one of said frictional members for causing the same, after contact, to move in the direction of rotation of its rotary element for causing the said frictional member to retard its rotary element, the connection between said two frictional members at the same time applying the other frictional member to its rotary element.

5. The combination with two rotary elements, of a frictional member coöperating with each of the same, means for bringing said members simultaneously into contact with said elements, and means for causing one of said frictional members to move, after contact, in the direction of rotation of its rotary element so as to retard the rotation thereof, the other frictional member being at the same time applied to its rotary element.

6. The combination with two rotary elements, of a frictional member coöperating with each of the same, means for bringing said members simultaneously into contact with said elements, and means for causing one of said frictional members to move, after contact, in the direction of rotation, of its rotary element so as to retard the rotation thereof, the other frictional member being at the same time applied to its rotary element by the operating pressure of the frictional member applied by rotation.

7. The combination with two rotary elements, of a frictional member coöperating with each of the same, and means for causing said members to move simultaneously into contact with said elements, the rotation of one of said rotary elements then setting with maximum braking force said members.

8. The combination with two rotary elements, of a frictional member coöperating with each of the same, and means for causing said members to move simultaneously into contact with said elements, the rotation of one of said rotary elements then setting with braking force said members, said means continuing to keep said frictional members set with braking force against said rotary elements until manually disengaged from said rotary elements.

9. The combination with two rotary elements, of a frictional member coöperating with each of the same, and means for causing said members to move simultaneously into contact with said elements, the rotation of one of the said rotary elements then setting with braking force the said members and means for graduating off manually said braking force.

Signed at New York city, in the county of New York and State of New York this 11th day of May A. D. 1915.

PORTER S. MORGAN.

Witnesses:
E. M. ENGELMAN,
THOMAS VEITCH.

Copies of this patent may be obtained for five cents each, by addressing the "Commissioner of Patents, Washington, D. C."